United States Patent
Yang et al.

(10) Patent No.: US 9,986,547 B2
(45) Date of Patent: May 29, 2018

(54) SIGNAL PROCESSING METHOD FOR MTC AND DEVICE THEREFOR

(71) Applicant: LG ELECTRONICS INC., Seoul (KR)

(72) Inventors: Suckchel Yang, Seoul (KR); Joonkui Ahn, Seoul (KR); Hyangsun You, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 15/029,543

(22) PCT Filed: Nov. 4, 2014

(86) PCT No.: PCT/KR2014/010501
§ 371 (c)(1),
(2) Date: Apr. 14, 2016

(87) PCT Pub. No.: WO2015/065151
PCT Pub. Date: May 7, 2015

(65) Prior Publication Data
US 2016/0262133 A1    Sep. 8, 2016

Related U.S. Application Data

(60) Provisional application No. 61/899,871, filed on Nov. 4, 2013.

(51) Int. Cl.
*H04W 72/02* (2009.01)
*H04W 72/04* (2009.01)
(Continued)

(52) U.S. Cl.
CPC ........ *H04W 72/042* (2013.01); *H04B 7/2656* (2013.01); *H04L 5/0092* (2013.01);
(Continued)

(58) Field of Classification Search
None
See application file for complete search history.

(56) References Cited

U.S. PATENT DOCUMENTS

2013/0083753 A1    4/2013  Lee et al.
2013/0315159 A1*  11/2013  Xia .................... H04W 72/042
                                                          370/329

OTHER PUBLICATIONS

CATT, "Discussion on Bandwidth Reduction for New Category UE," R1-135062, 3GPP TSG RAN WG1 Meeting #75, San Francisco; USA, Nov. 11-15, 2013 (retrieved Nov. 1, 2013), pp. 1-2.
(Continued)

*Primary Examiner* — Alex Skripnikov
(74) *Attorney, Agent, or Firm* — Birch, Stewart, Kolasch & Birch, LLP

(57) ABSTRACT

The present invention relates to a wireless communication system. Particularly, the present invention relates to a method by which a terminal receives a downlink signal in a wireless communication system and a device therefor, and the method comprises the steps of: acquiring information on a subframe configuration; receiving a subframe including a first time domain and a second time domain; and storing, in a first receiving buffer, a downlink signal on a receiving band in the second time domain of the subframe, wherein the size of the receiving band is set differently according to each subframe configuration by using the information on the subframe configuration.

10 Claims, 9 Drawing Sheets

(51) Int. Cl.
H04B 7/26 (2006.01)
H04W 4/00 (2018.01)
H04L 5/00 (2006.01)

(52) U.S. Cl.
CPC ............ *H04W 4/005* (2013.01); *H04L 5/005* (2013.01); *H04L 5/0007* (2013.01); *H04W 72/0453* (2013.01)

(56) References Cited

OTHER PUBLICATIONS

Fujitsu, "On MTC Band Allocation," R1-135133, 3GPP TSG-RAN WG1 Meeting #75, San Francisco, USA, Nov. 11-15, 2013 (retrieved Nov. 2, 2013), pp. 1-3.

NEC, "PDSCH Frequency Location of Reduced Bandwidth for MTC," R1-135266, 3GPP TSG RAN WG1 Meeting #75, San Francisco, USA, Nov. 11-15, 2013 (retrieved Nov. 1, 2013), pp. 1-4.

Sharp, "Further Consideration on the Reduced PDSCH Frequency Allocation for Low-cost UE," R1-135341, 3GPP TSG RAN WG1 Meeting #75, San Francisco, USA, Nov. 11-15, 2013 (retrieved Nov. 2, 2013), pp. 1-7.

* cited by examiner

* size of scheduling BW is controlled according to subframe (set) in consideration of subframe structure/configuration

* size of scheduling BW can be configured in advance according to subframe structure/configuration

… (1)

SIGNAL PROCESSING METHOD FOR MTC AND DEVICE THEREFOR

CROSS REFERENCE TO RELATED APPLICATIONS

This application is the National Phase of PCT International Application No. PCT/KR2014/010501, filed on Nov. 4, 2014, which claims priority under 35 U.S.C. 119(e) to U.S. Provisional Application No. 61/899,871, filed on Nov. 4, 2013, all of which are hereby expressly incorporated by reference into the present application.

TECHNICAL FIELD

The present invention relates to a method of processing a signal in a wireless communication system and an apparatus therefor. More particularly, the present invention relates to a method of processing a signal for MTC (machine type communication), a signaling method and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE OF THE INVENTION

Technical Task

An object of the present invention is to provide a method of efficiently transmitting/processing a signal in a wireless communication system and an apparatus therefor. Specifically, an object of the present invention is to provide a method of efficiently transmitting/processing a signal for MTC, a signaling method and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of receiving a downlink signal, which is received by a user equipment (UE) in a wireless communication system, includes the steps of obtaining information on a subframe configuration, receiving a subframe including a first time domain and a second domain and storing a downlink signal on a reception band in a first reception buffer in the second time domain of the subframe. In this case, a size of the reception band can be differently configured according to a subframe configuration using the information on the subframe configuration.

Preferably, the method can further include the step of storing a downlink signal on a system band in a second reception buffer in the first time domain of the subframe. In this case, the size of the reception band may be smaller than a size of the system band.

Preferably, the information on the subframe configuration can include at least one selected from the group consisting of CP (cyclic prefix) configuration information, special subframe configuration information, RS (reference signal) configuration information and information on a length of the first time domain.

Preferably, if a normal CP is set, the size of the reception band corresponds to the N1 number of RBs (resource blocks). If an extended CP is set, the size of the reception band corresponds to the N2 number of RBs. The N1 corresponds to a positive integer, the N2 corresponds to a positive integer and the N1 may be smaller than the N2.

Preferably, if the normal CP is set, the number of OFDM (orthogonal frequency division multiplexing) symbols available for transmitting data in the subframe corresponds to K1. If the extended CP is set, the number of OFDM symbols available for transmitting data in the subframe corresponds to K2. The K1 corresponds to a positive integer, the K2 corresponds to a positive integer and the K1 may be greater than the K2.

Preferably, the N1 may correspond to 6 and the N2 may correspond to 7.

To further achieve these and other advantages and in accordance with the purpose of the present invention, according to a different embodiment, a user equipment used in a wireless communication system can include an RF (radio frequency) unit and a processor, the processor configured to obtain information on a subframe configuration, the processor configured to receive a subframe including a first time domain and a second domain, the processor configured to store a downlink signal on a reception band in a first reception buffer in the second time domain of the subframe. In this case, a size of the reception band can be differently configured according to a subframe configuration using the information on the subframe configuration.

Preferably, the processor is configured to store a downlink signal on a system band in a second reception buffer in the first time domain of the subframe. In this case, the size of the reception band may be smaller than a size of the system band.

Preferably, the information on the subframe configuration can include at least one selected from the group consisting of CP (cyclic prefix) configuration information, special subframe configuration information, RS (reference signal) configuration information and information on a length of the first time domain.

Preferably, if a normal CP is set, the size of the reception band corresponds to the N1 number of RBs (resource blocks). If an extended CP is set, the size of the reception band corresponds to the N2 number of RBs. The N1 corresponds to a positive integer, the N2 corresponds to a positive integer and the N1 may be smaller than the N2.

Preferably, if the normal CP is set, the number of OFDM (orthogonal frequency division multiplexing) symbols available for transmitting data in the subframe corresponds to K1. If the extended CP is set, the number of OFDM symbols available for transmitting data in the subframe corresponds to K2. The K1 corresponds to a positive integer, the K2 corresponds to a positive integer and the K1 may be greater than the K2.

Preferably, the N1 may correspond to 6 and the N2 may correspond to 7.

DESCRIPTION OF DRAWINGS

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Mode for Invention

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/ Enhanced Data Rates for GSM Evolution (GSM/GPRS/ EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
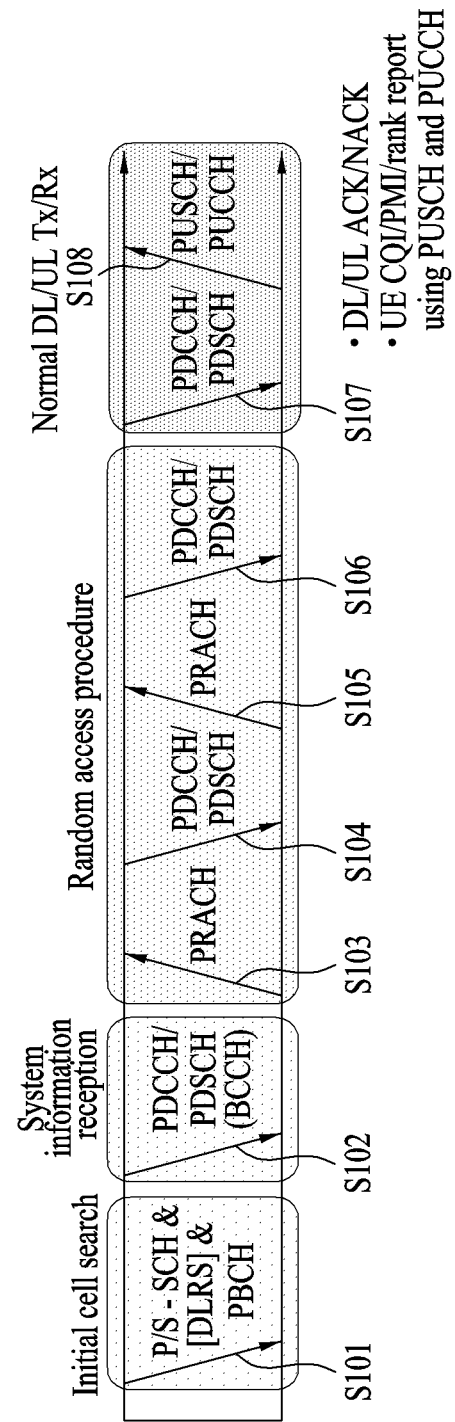
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/ PDSCH (S107) and transmit a PUSCH/PUCCH (S108) in a general UL/DL signal transmission procedure.

Figure 2:
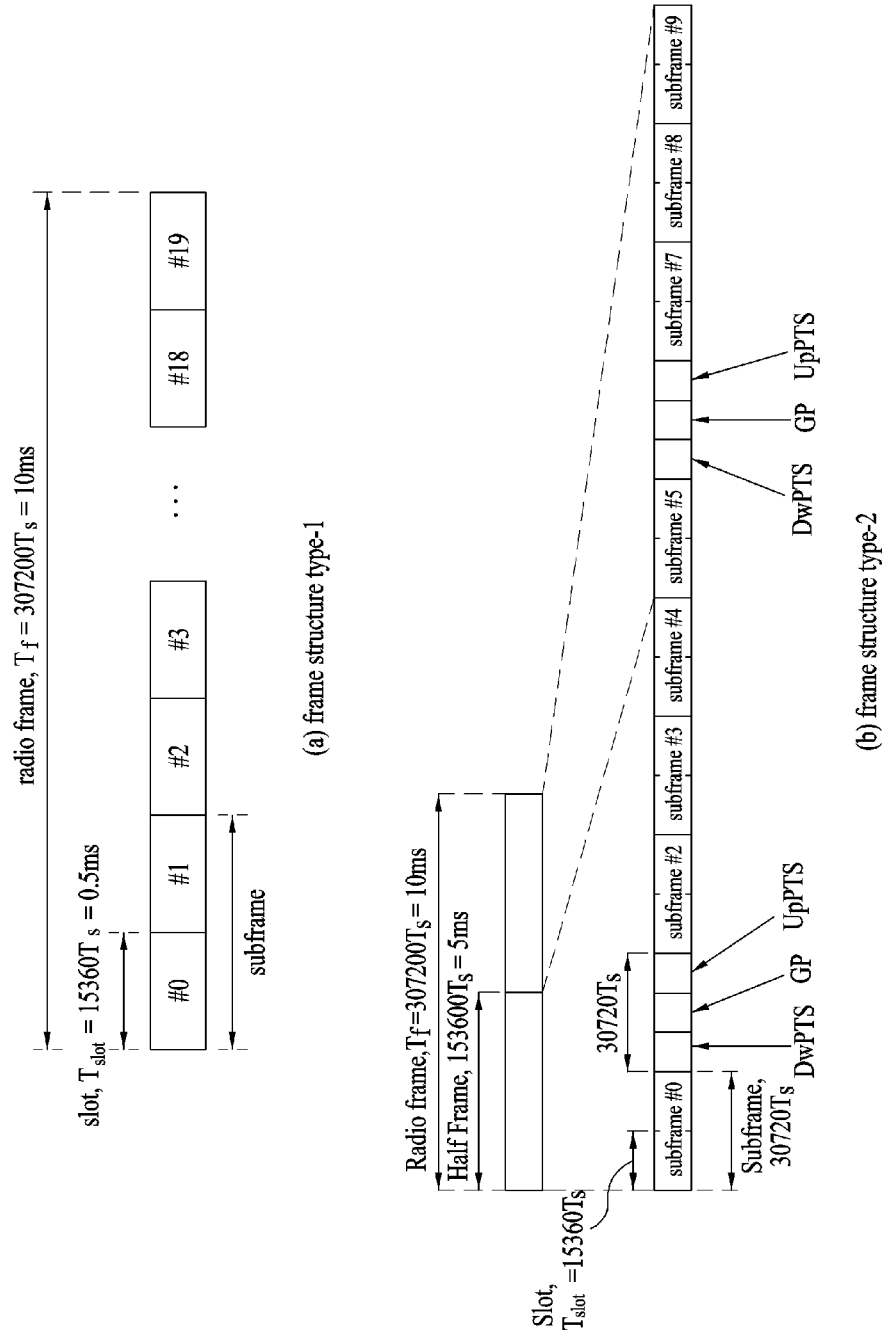
FIG. 2 illustrates a radio frame structure in the LTE(-A) system.

FIG. 2 illustrates a radio frame structure in the LTE(-A) system. A type 1 radio frame structure applicable to Frequency Division Duplex (FDD) and a type 2 radio frame structure applicable to Time Division Duplex (TDD) are supported.

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL)SC-FDMA symbols in the time domain. Unless mentioned otherwise, an OFDM symbol or an SC-FDMA symbol may be simply referred to as a symbol (sym), herein.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

Table 1 lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a DL subframe, U represents a UL subframe, and S represents a special subframe.

Table 2 shows DwPTS/GP/UpPTS length according to a special subframe configuration. In Table 2, $T_s$ corresponds to sampling time.

TABLE 2

| | Normal cyclic prefix in downlink | | | Extended cyclic prefix in downlink | | |
|---|---|---|---|---|---|---|
| | | UpPTS | | | UpPTS | |
| | | Normal cyclic prefix in uplink | Extended cyclic prefix in uplink | | Normal cyclic prefix in uplink | Extended cyclic prefix in uplink |
| Special subframe configuration | DwPTS | | | DwPTS | | |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described structures of the radio frame are exemplary only. And, the number of subframes included in a radio frame, the number of slots included in the subframe and the number of symbols included in the slot may be modified in various ways.

Figure 3:
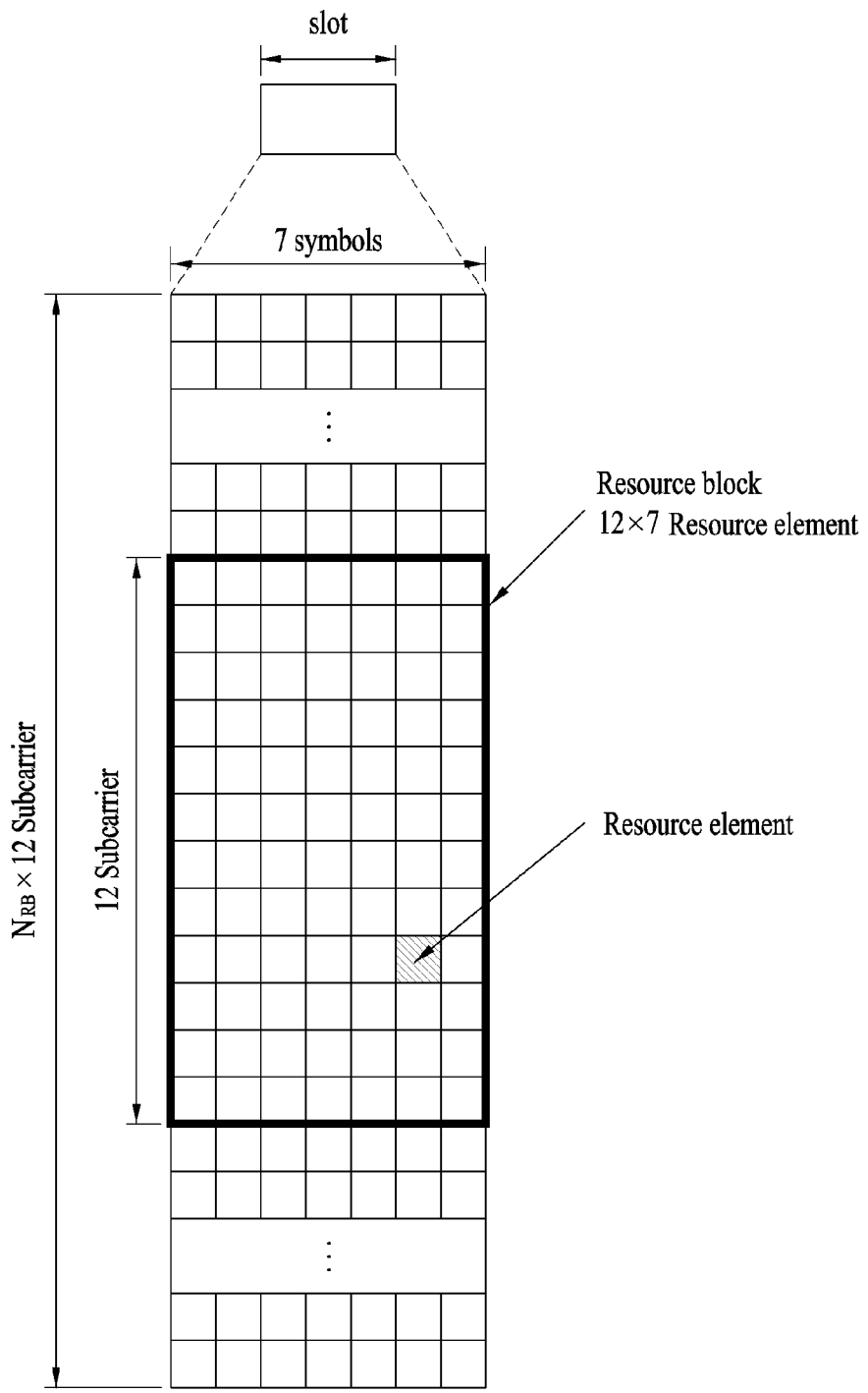
FIG. 3 illustrates a resource grid for the duration of a downlink slot.

FIG. 3 is a diagram for one example of a resource grid for a downlink slot. Referring to FIG. 3, one downlink (DL) slot may include a plurality of OFDM symbols in time domain.

If a normal CP (cyclic prefix) is set, one DL slot includes 7 OFDM symbols. If an extended CP is set, one DL slot includes 6 OFDM symbols. One resource block (RB) includes 12 subcarriers in frequency domain. Each element on a resource grid is called an RE (resource element). The RE corresponds to a minimum unit for transmitting a signal and one modulation symbol is mapped to an RE. One resource block includes 12×7 resource elements. The number ($N_{RB}$) of resource blocks may depend on a system bandwidth (BW). A structure of an uplink (UL) slot may be identical to that of the DL slot, while an OFDM symbol is replaced with an SC-FDMA symbol.

Figure 4:
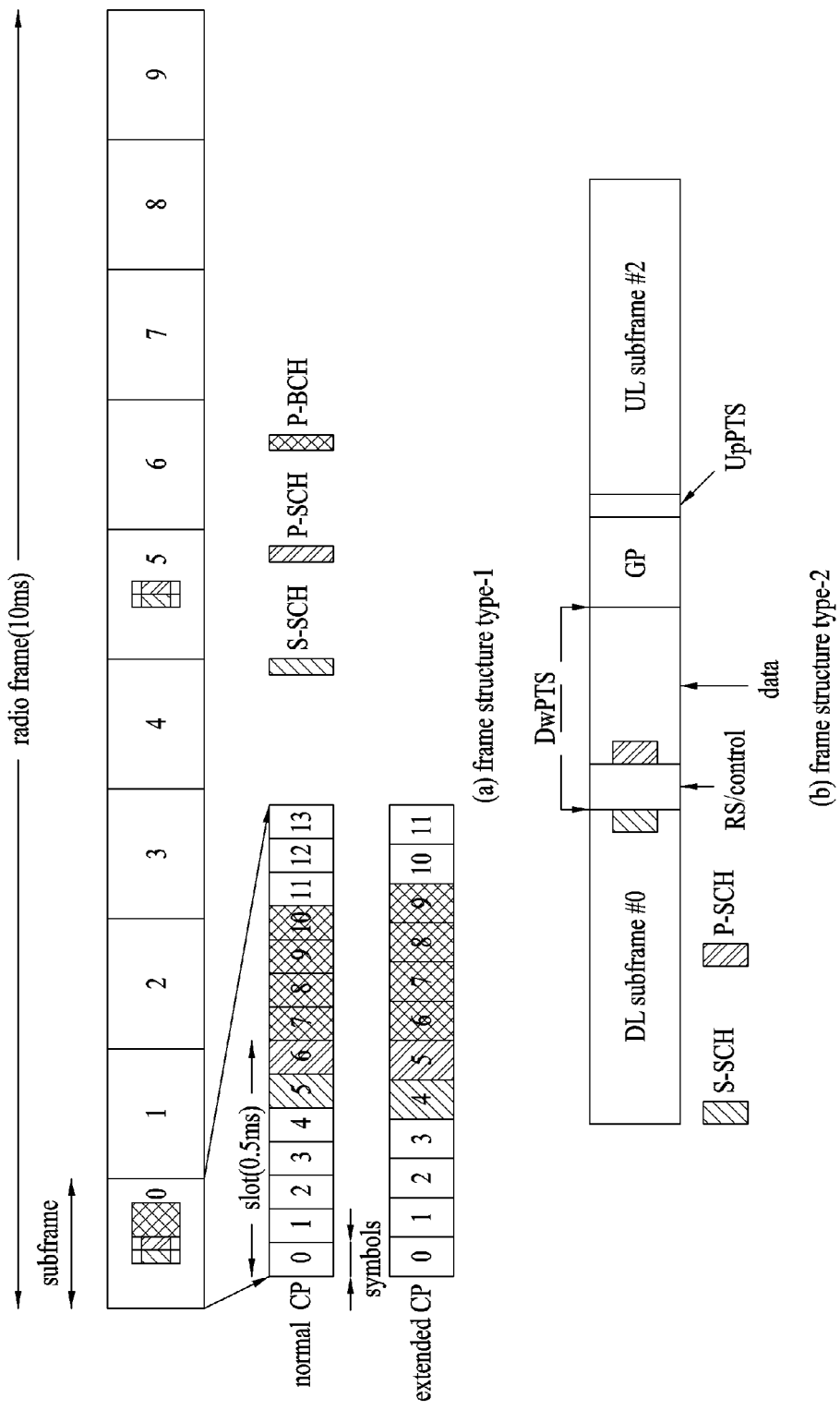
FIG. 4 illustrates configurations of a synchronization channel and a broadcast channel.

FIG. 4 illustrates a primary broadcast channel (P-BCH) and a synchronization channel (SCH). The SCH includes a primary SCH (P-SCH) and a secondary SCH (S-SCH). The P-SCH carries a primary synchronization signal (PSS) and the S-SCH carries a secondary synchronization signal (SSS).

Referring to FIG. 4, in frame structure type-1 (i.e. FDD), the P-SCH is disposed at the last OFDM symbols of slot #0 (i.e. the first slot of subframe #0) and slot #10 (i.e. the first slot of subframe #5) in each radio frame. The S-SCH is disposed at OFDM symbols immediately before the last OFDM symbols of slot #0 and slot #10 in each radio frame. The S-SCH and the P-SCH are located at neighboring OFDM symbols. In frame structure type-2 (i.e. TDD), the P-SCH is transmitted through third OFDM symbols of subframe #1/#6 and the S-SCH is disposed at the last OFDM symbols of slot #1 (i.e. the second slot of subframe #0) and slot #11 (i.e. the second slot of subframe #5). The P-BCH is transmitted for every four radio frames using first to fourth OFDM symbols of the second slot of subframe #0, irrespective of frame structure type. The P-SCH is transmitted using 72 subcarriers (10 subcarriers being reserved and 62 subcarriers carrying the PSS) on the basis of a direct current (DC) subcarrier in OFDM symbols. The S-SCH is transmitted using 72 subcarriers (10 subcarriers being reserved and 62 subcarriers carrying the SSS) on the basis of a DC subcarrier in OFDM symbols. The P-BCH is mapped to 72 subcarriers on the basis of 4 OFDM symbols and DC subcarrier in one subframe.

Figure 5:
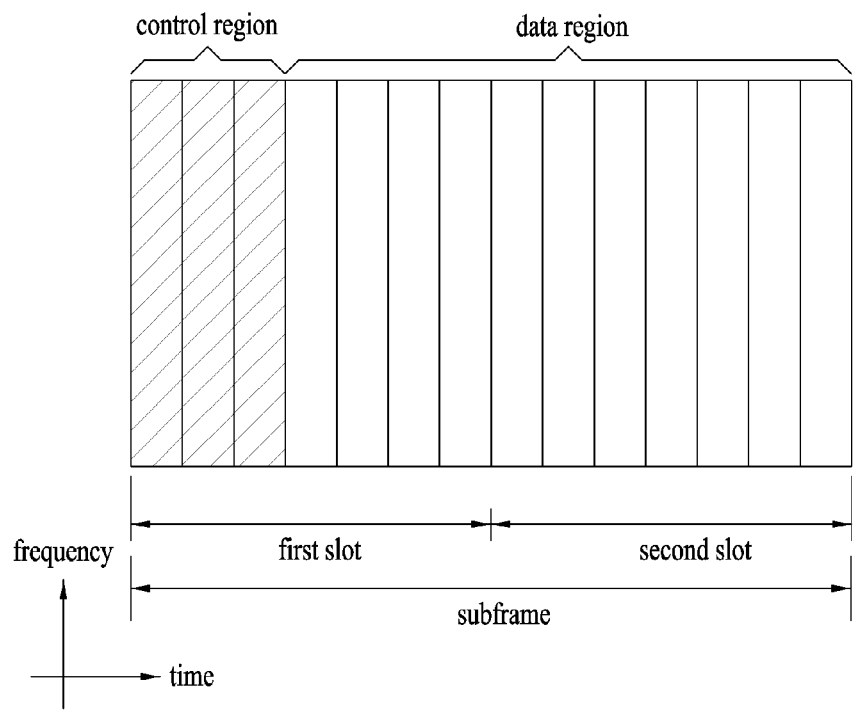
FIG. 5 illustrates an exemplary Downlink (DL) SubFrame (SF) structure.

FIG. 5 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PC- FICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/ Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

Table 3 lists the number of CCEs, the number of REGs, and the number of PDCCH bits for each PDCCH format.

TABLE 3

| PDCCH format | Number (n) of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI) according to the owner or usage of a PDCCH. In other words, the PDCCH is CRC-scrambled with the ID (e.g., the RNTI).

Table 4 lists exemplary IDs by which a PDCCH is masked.

TABLE 4

| Type | Identifier | Description |
| --- | --- | --- |
| UE-specific | C-RNTI, TC-RNTI, SPS C-RNTI | used for a unique UE identification |
| Common | P-RNTI | used for paging message |
|  | SI-RNTI | used for system information |
|  | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE/LTE-A standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

Table 5 lists CSS sizes and USS sizes.

TABLE 5

| PDCCH format | Number of CCEs (n) | Number of PDCCH candidates in CSS | Number of PDCCH candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM)

configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs

TM 1: transmission from a single eNB antenna port
TM 2: transmit diversity
TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI Formats format 0: resource grant for PUSCH transmission
format 1: resource allocation for single-codeword PDSCH transmission (TMs 1, 2 and 7)
format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 6:
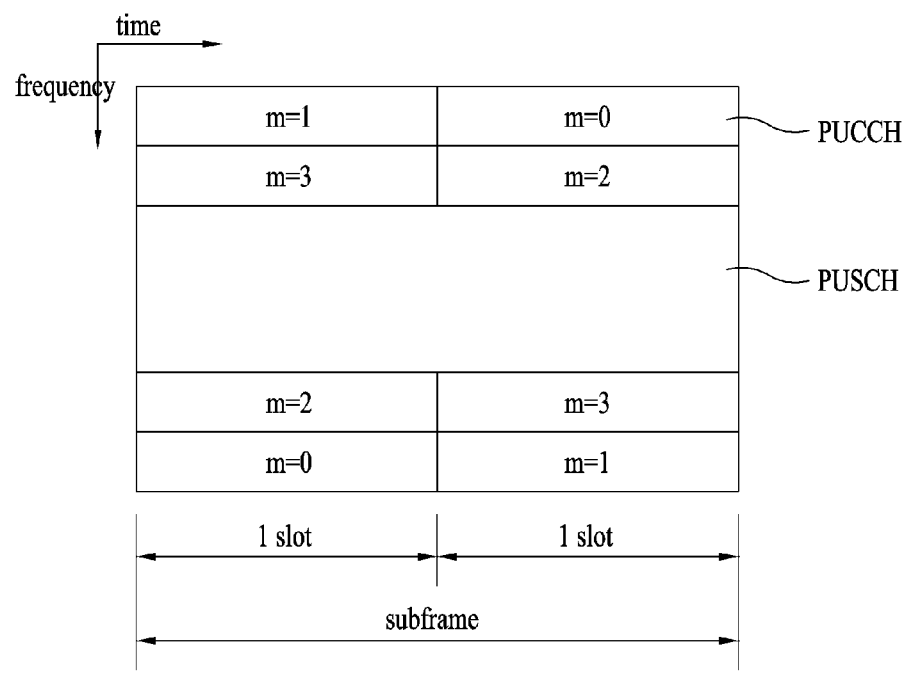
FIG. 6 illustrates an Uplink (UL) SF structure.

FIG. 6 illustrates a structure of a UL subframe.

Referring to FIG. 6, a UL subframe includes a plurality of slots (e.g. 2 slots). Each slot may include a different number of SC-FDMA symbols according to a Cyclic Prefix (CP) length. For example, if a normal CP is set, one slot includes 7 SC-FDMA symbols. If an extended CP is set, one slot includes 6 SC-FDMA symbols. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary. The PUCCH may carry the following control information.

Scheduling Request (SR): information used to request UL-SCH resources. The SR is transmitted in On-Off Keying (OOK).

HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.

Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

Table 5 illustrates a mapping relationship between PUCCH formats and UCI in the LTE system.

TABLE 5

| PUCCH format | Uplink Control Information (UCI) |
|---|---|
| format 1 | SR(Scheduling Request) (non-modulated waveform) |
| format 1a | 1-bit HARQ ACK/NACK (SR present/absent) |
| format 1b | 2-bit HARQ ACK/NACK (SR present/absent) |
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

An SRS is periodically or aperiodically transmitted through a last SC-FDMA symbol of a subframe. An SRS subframe includes a cell-specific SRS parameter and a UE-specific SRS parameter. The cell-specific SRS parameter informs a UE of subframes which are occupied to transmit an SRS in a cell. The UE-specific SRS parameter informs a UE of a subframe to be actually used for transmitting an SRS by the UE among the subframes occupied for the SRS. Periodic SRS (p-SRS) transmission is periodically performed according to a determined period. To this end, an SRS transmission period ($T_{SRS}$) and an SRS subframe offset ($T_{OFFSET}$) are configured according to a UE. Aperiodical SRS (a-SRS) transmission is indicated by DG/UG/DCI. If a UE receives an SRS request, the UE transmits an SRS in a first SRS-transmittable subframe appearing after 4 subframes. A subframe capable of performing aperiodic SRS transmission is periodically configured. To this end, an SRS transmission period ($T_{SRS,1}$) and an SRS subframe offset ($T_{OFFSET,1}$) are separately configured.

Figure 7:
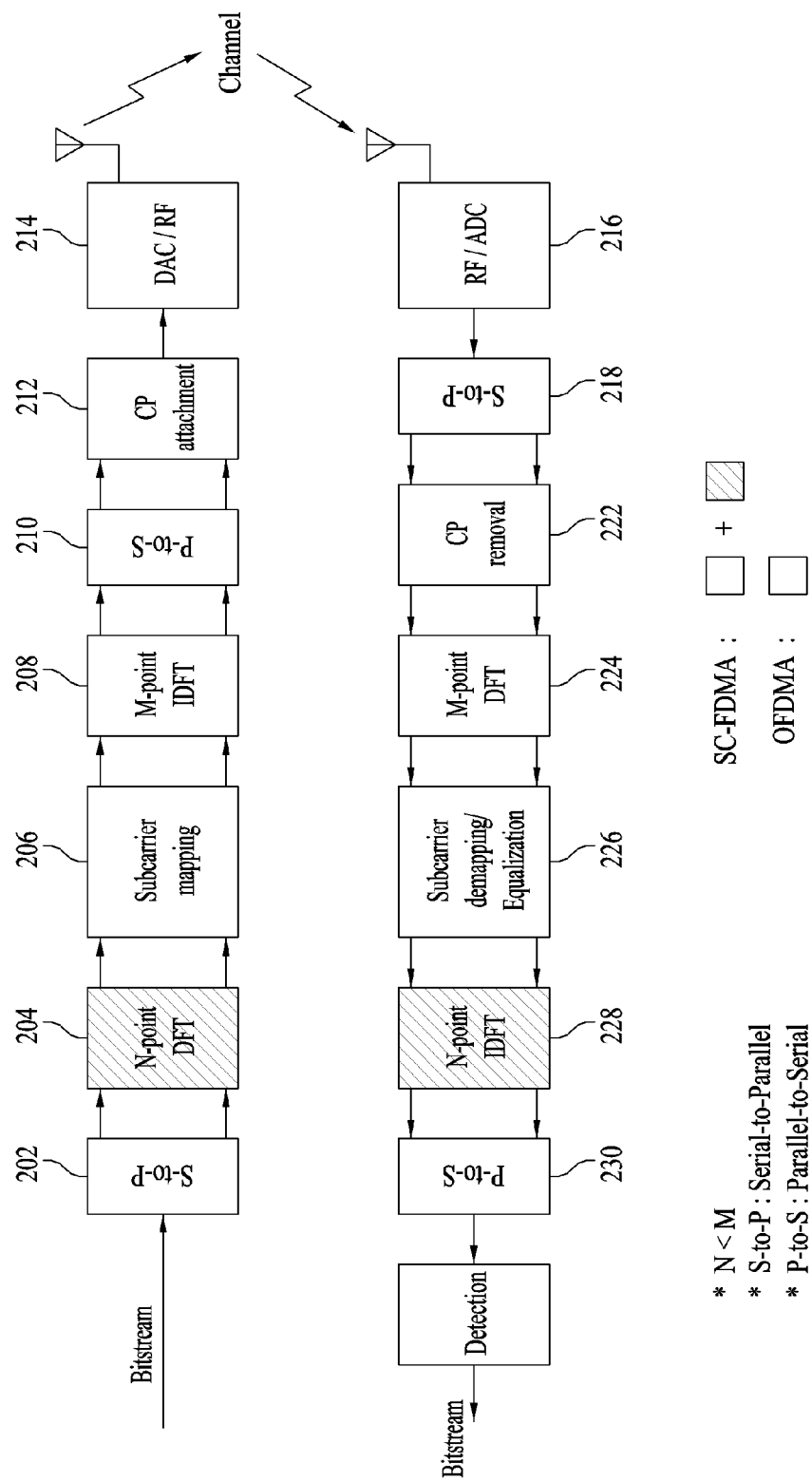
FIG. 7 is a block diagram illustrating a transmitter and a receiver for OFDMA and SC-FDMA.

FIG. 7 is a block diagram illustrating a transmitter and a receiver for OFDMA and SC-FDMA. A transmitter may correspond to a part of a UE in UL and a receiver may correspond to a part of a base station in UL. The transmitter may correspond to a part of the base station in DL and the receiver may correspond to a part of the UE in DL.

An OFDMA transmitter includes a serial to parallel converter 202, a subcarrier mapping module 206, an M-point IDFT module 208, a CP (cyclic prefix) adding module 210, a parallel to serial converter 212 and an RF (radio frequency)/DAC (digital to analog converter) module 214. A signal processing procedure of the OFDMA transmitter is explained in the following. First of all, a bit stream is modulated into a data symbol sequence. The bit stream can be obtained by performing various signal processing such as channel encoding, interleaving, scrambling, and the like on a data block delivered from a MAC (medium access control) layer. The bit stream is also referred to as a codeword and is equivalent to the data block received from the MAC layer. A modulation scheme can include BPSK (binary phase shift keying), QPSK (quadrature phase shift keying), and n-QAM (quadrature amplitude modulation), by which the present invention may be non-limited. Subsequently, a serial data symbol sequence is converted into N number of parallel data symbols (202). The N number of data symbols are mapped to the N number of assigned subcarriers among the total M number of subcarriers and the M-N number of remaining subcarriers are padded by 0 (206). The data symbol mapped to frequency domain is converted into a time domain sequence via M-point IDFT processing (208). Subsequently, in order to reduce inter-symbol interference (ISI) and inter-carrier interference (ICI), a CP is added to the time domain sequence to generate an OFDMA symbol (210). The generated OFDMA symbol is converted to serial from parallel (212). Subsequently, the OFDMA symbol is transmitted to the receiver in a manner of passing through such a process as digital-to-analog conversion, frequency up-conversion and the like (214). An available subcarrier among the M-N number of subcarriers is assigned to a different user. On the contrary, an OFDMA receiver includes an RF/ADC (analog to digital converter) module (216), a serial to parallel converter (218), a CP removing module (222), an M-point DFT module 224, a subcarrier de-mapping/equalization module (226), a parallel to serial converter (228), a serial to parallel converter (230) and a detection module. A signal processing procedure of the OFDMA receiver is configured by a procedure opposite to the procedure of the OFDMA transmitter.

Meanwhile, compared to the OFDMA transmitter, an SC-FDMA transmitter additionally includes an N-point DFT module (204) prior to the subcarrier mapping module (206). The SC-FDMA transmitter disperses a plurality of data to frequency domain via DFT before IDFT processing is performed. By doing so, PARR of a transmission signal can be considerably reduced compared to the OFDMA scheme. Compared to the OFDMA receiver, an SC-FDMA receiver additionally includes an N-point IDFT module (228) after the subcarrier de-mapping module (226). A signal processing procedure of the SC-FDMA receiver is configured by a procedure opposite to the procedure of the SC-FDMA transmitter.

Figure 8:
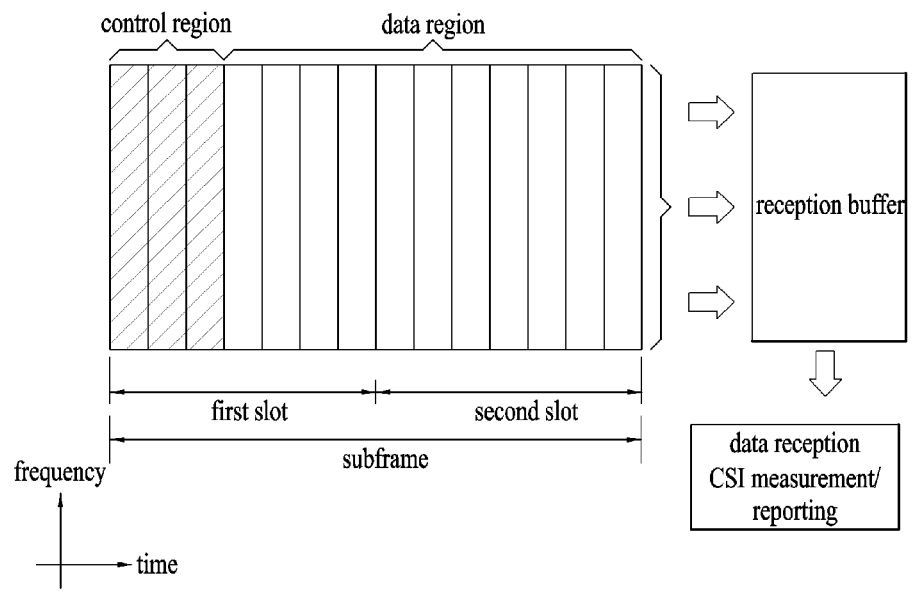
FIG. 8 is a diagram for an example of processing a downlink signal.

FIG. 8 is a diagram for an example of processing a downlink signal. A reception buffer is installed in a UE to receive and buffer a downlink signal. A downlink signal can be buffered while a relevant control channel is detected/received/decoded or before the control channel is terminated. Specifically, a UE stores signals on the whole bands of a system at the reception buffer in every non-DRX (discontinuous reception) subframe. In particular, the UE stores signals on subframe * system band at the reception buffer. One or more reception buffers can be added to a proper position after the M-point DFT module (224) shown in FIG. 7. A system band is defined by an RB unit and broadcasted to UEs within a cell through PBCH (i.e., MIB). A UE can perform various operations using a signal stored in a reception buffer. For example, if a UE detects a control channel (e.g., PDCCH) from a reception buffer, the UE can read/process (decode, demodulate) PDSCH corresponding to the PDCCH from the reception buffer. And, the UE can measure/report CSI based on a signal stored in the reception buffer.

Embodiment: Signal Transmission/Processing for MTC (Machine Type Communication)

A next system of LTE-A considers configuring a UE of low cost/low specification mainly performing data communication such as metering, measuring a water level, utilizing a surveillance camera, inventory reporting of a vending machine and the like. For clarity, the UE is commonly referred to as a LC UE type (or, LC type UE, LC UE). In case of the LC UE type, since a transmission data amount is small and UL/DL data transmission and reception occurs once in a while, it might be efficient to lower UE cost and reduce battery consumption in accordance with a low data transmission rate. And, the LC UE, type has a characteristic of less mobility and channel environment that seldom changes. Various coverage enhancement schemes are under discussion according to each channel/signal in consideration of a poor situation that a future LC UE type is installed in a coverage-limited place such as a building, a factory, a basement and the like. As an example, a method of repeatedly transmitting a channel/signal to enhance MTC coverage is under discussion.

Meanwhile, as a technology for lowering cost and specification of the LC UE type, a technology for reducing the number of reception antennas, a technology for reducing maximum TB size, a technology for reducing a reception buffer size and the like are under discussion.

Figure 9:
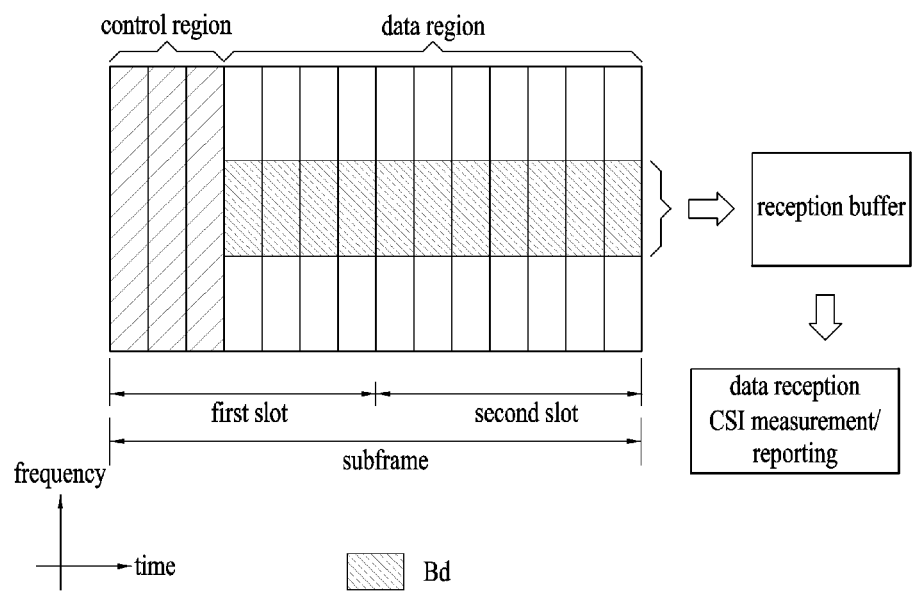
FIG. 9 is a diagram for an example of processing a signal processed in an LC UE (low cost user equipment)

FIG. 9 shows an example for a method of reducing a reception buffer size. The reception buffer size can be reduced in a manner of reducing a reception frequency section/range of a UE (e.g., limit to a small number of specific RB(s)). The reception frequency section/range corresponds to a reception frequency section/range received by the UE and the reception frequency section/range is referred to as a reception BW (bandwidth) for clarity. A reception buffer is used for receiving and buffering signals on the reception BW. A reception signal can be buffered while a relevant control channel (e.g., PDCCH) is detected/received/decoded or before the control channel is terminated.

In relation to this, in case of a control channel (e.g., PDCCH, PCFICH, or PHICH), resources (e.g., RE/REG/CCE, etc.) constructing the control channel can be distributed to a whole system BW (bandwidth) via interleaving and the like. Hence, in case of the control channel, it may be difficult to reduce a reception BW. On the contrary, in case of a data channel (e.g., PDSCH), resources constructing the data channel can be restricted to a specific frequency resource (e.g., RB set) according to scheduling of a base station. Hence, in case of the data channel, as shown in FIG. 9, a reception buffer size can be reduced by reducing a reception BW. For clarity, a reception buffer (region) for a control channel is referred to as a reception control buffer and a reception buffer (region) for a data channel is referred to as a reception data buffer. The reception control buffer (region) and the reception data buffer (region) can be configured by a single buffer or buffers separate from each other. And, a BW used for receiving a control channel is defined as Bc and a reduced reception BW used for receiving a data channel (e.g., PDSCH) is defined as a scheduling BW (Bd). Depending on an implementation example, the Bc is provided in a manner of being identical to a system BW or is provided as a reduced BW similar to the Bd. A BW size can be provided in an order of 'Bd<Bc≤system BW' or Bd≤Bc≤system BW'. As an example, if a system BW corresponds to 20 MHz or 100 RBs, Bc corresponds to 20 MHz or 100 RBs and Bd can be configured by 1.4 MHz or 6 RBs positioned at a center frequency (center carrier, fc) of a cell. In a cell, a position of a scheduling BW can be identically configured for all UEs within the cell or can be differently configured according to a UE (group). A base station can assign PDSCH to a UE using one or more RBs within the scheduling BW.

Meanwhile, an amount of DL resources (e.g., number of OFM symbols usable for scheduling/transmitting data) in an SF may vary depending on a situation. For example, a normal SF using a normal CP is configured by 14 OFDM symbols in total. On the contrary, a normal SF using an extended CP is configured by 12 OFDM symbols in total. And, in case of a special SF used in TDD, the number of OFDM symbols constructing a DL resource (i.e., DwPTS section) may have various values according to a configuration (refer to Table 2). Specifically, a DL resource of a special SF is configured by 3/6/9/10/11/12 OFDM symbols when a normal CP is used. When an extended CP is used, a DL resource of a special SF is configured by 3/5/8/9/10 OFDM symbols. And, in case of an RB in which a PSS/SSS signal for DL synchronization is transmitted, the number of OFDM symbols available for scheduling or transmitting actual data can be reduced as many as the number of OFDM symbols (e.g., 1 or 2) occupied by the PSS/SSS signal. In case of an RB in which a PBCH signal for transmitting system information is transmitted, the number of OFDM symbols available for scheduling/transmitting actual data can be reduced as many as the number of OFDM symbols (e.g., 4) occupied by the PBCH signal. In particular, an amount of available DL resources varies according to an SF structure/configuration (e.g., CP length, SF type, RB area).

In this situation, if a scheduling BW of an LC UE is always fixed by an identical number of RBs irrespective of an SF structure/configuration, an efficiency of a given (implemented) reception buffer (size) is decreased, thereby increasing unnecessary performance degradation and overhead. As an example, assume that the number of RBs of a scheduling BW corresponding to a reception buffer size, which is designed or implemented on the basis of an amount of DL resources in a normal CP/normal SF, corresponds to N. In this case, if the N number of RBs are identically allocated as a scheduling BW in an extended CP/normal SF, a reception buffer is less used as much as a difference (e.g., 2 OFDM symbols) between the number of OFDM symbols of the normal CP/normal SF and the number of OFDM symbols of the extended CP/normal SF. This may be inefficient in the aspect of a TB size, MCS level determination, data transmission RB allocation, etc.

In the following description, a method of differently assigning a scheduling BW for a LC UE according to an SF structure/configuration is proposed. The SF structure/configuration may vary according to a CP length (e.g., normal/extended CP), a radio frame type (e.g., FDD/TDD), an SF type (e.g., normal/special SF), an RB region (e.g., PSS/SSS/PBCH transmission region), an RS resource (e.g., CRS, CSI-RS, DMRS, number of antenna ports) and the like, by which the present invention may be non-limited. The majority of information on the SF structure/configuration is broadcasted through a system information (e.g., PBCH (MIB)), RRC (radio resource control)) message and a CP length can be identified by a time difference between a PSS and an SSS. In the following description, a UE may correspond to an LC-MCT UE, an LC UE or an LC type UE. Unless it is specifically mentioned, a reception buffer may correspond to a reception data buffer in the following description. The reception buffer may correspond to a reception buffer separately configured for a data channel or a storage space/area allocated for a data channel in the reception buffer.

Figure 10:
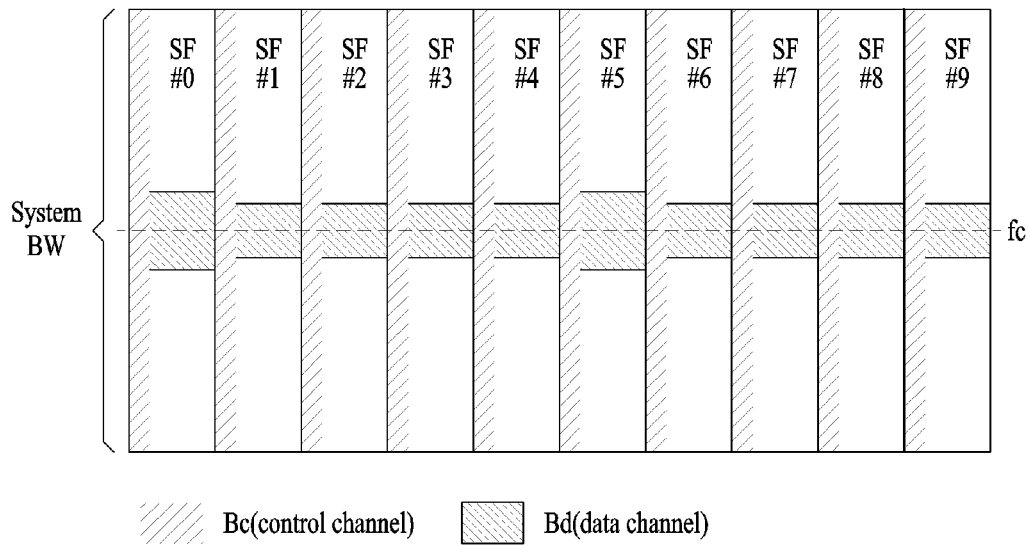
FIGS. 10 to 11 illustrate examples of processing a signal according to the present invention.

FIG. 10 shows an example for a method of controlling a scheduling BW according to the present invention. Referring to FIG. 10, when a UE receives a non-DRX subframe, the UE stores signals within a control region (refer to FIG. 5) in a reception control buffer in a total system band (Bc) to receive a control channel. And, the UE stores signals within a data region (refer to FIG. 5) in a reception data buffer in a scheduling band (Bd) only to receive a data channel (e.g., PDSCH). The reception control buffer and the reception data buffer can be configured by a single buffer or buffers separate from each other. A drawing shows an example of a FDD radio frame. As shown in FIG. 4, since a PSS/SSS is transmitted at a center frequency area of an SF #0/#5, if a scheduling BW is overlapped with an RB set in which the PSS/SSS is transmitted, an amount of resources available for scheduling data is reduced. Hence, in order to efficiently use the reception data buffer, it may be able to configure a scheduling BW of the SF #0/#5 to be greater than a scheduling BW of a different SF. As mentioned in the foregoing description, it is able to efficiently use a reception buffer in a manner of differently controlling a scheduling BW according to an SF structure/configuration or a subframe (set).

In the following, a method of determining a scheduling BW according to an SF structure/configuration or a subframe (set) is explained in detail. A method of determining a scheduling BW of a specific SF based on a scheduling BW of a reference SF is explained, by which the present invention may be non-limited. The reference SF may correspond to an SF (structure/configuration) becoming a reference when a reception buffer size is determined. For example, the reference SF may correspond to a normal SF (a normal CP). For clarity, it may be defined as follows.

N1: A scheduling BW of a reference SF (number of RBs)
K1: Number of OFDM symbols available for scheduling data in a reference SF
N2: A scheduling BW of a specific SF (number of RBs)
K2: Number of OFDM symbols available for scheduling data in a specific SF
M: Number of REs included in an OFDM symbols within an RB (e.g., M=12)

The number (L) of REs corresponding to a given reception buffer size can be represented as 'K1×M×N1−A1'. In this case, the A1 may correspond to 0 or the number of REs occupied by a specific RS (e.g., CRS) in a region of the N1 number of RBs (it may assume the specific number or the maximum number of antennas (e.g., 4)).

In this case, a scheduling BW (N2) of a specific SF can be determined/assigned by a maximum integer satisfying 'L≥K2×M×N2−A2'. The A1 and the A2 may be equal to 0. If the A1 corresponds to the number of REs occupied by a specific RS (e.g., CRS) in the region of the N1 number of RBs, the A2 may correspond to the number of REs occupied by a specific RS (e.g., CRS) in a region of the N2 number of RBs (it may assume the specific number or the maximum number of antennas (e.g., 4)). The K1 and the K2 can be respectively determined in a reference SF and a specific SF according to an OFDM symbol period (i.e., CFI value) for transmitting a control channel (e.g., PDCCH), a CP length of a specific SF (e.g., normal/extended CP), the number of OFDM symbols constructing a DL section (i.e., DwPTS) when a specific SF corresponds to a special SF, whether or not a PSS/SSS/PBCH exists in a specific SF when a scheduling BW is overlapped with center 6 RBs. Hence, a scheduling BW can be differently assigned according to an SF structure/configuration.

Assumption: Reference SF Structure/Configuration and Reception Buffer Size

For a more concrete example, a reference SF (structure/configuration) is assumed as follows.

Normal CP-based normal SF not including PSS/SSS/PBCH signal
CFI=2

In this case, the number of OFDM symbols available for scheduling data in a reference SF becomes K1=14−2=12. For clarity, when M is assumed as 12, if the number of RBs (N1) of a scheduling BW is determined by 6 in a state that the number of REs occupied by a CRS is not separately calculated, the number of REs corresponding to a buffer size becomes 864 (L=K1×M×N1=12×12×6).

Under the aforementioned assumption, a scheduling BW in a specific SF can be given as follows.

Example 1: Extended CP-Based Normal SF

For clarity, assume that a CFI corresponds to 2. In this case, the number (K2) of OFDM symbols available for scheduling data becomes 10 in a specific SF (K2=12−2=10). Hence, the number (N2) of RBs of a scheduling BW can be determined/assigned by 7 (864≥10×12×7=840) corresponding to a maximum integer satisfying 'L≥K2×M×N2' (i.e., 864≥10×12×N2).

Example 2: TDD Special SF

For clarity, assume that a CFI corresponds to 2 and the number of OFDM symbols constructing a DwPTS section of a TDD special SF corresponds to 9. In this case, the number (K2) of OFDM symbols available for scheduling data becomes 7 in a specific SF (K2=9−2=7). Hence, the number (N2) of RBs of a scheduling BW can be determined/assigned by 10 (864≥7×12×10=840) corresponding to a maximum integer satisfying 'L≥K2×M×N2' (i.e., 864≥7×12×N2).

Example 3: RB Region in which PSS/SSS/PBCH is Transmitted

It is able to configure a scheduling BW to include an RB region (e.g., center 6 RBs) in which a PSS/SSS/PBCH signal is transmitted or configure the scheduling BW to be overlapped with the RB region. For clarity, assume that a CFI corresponds to 2 and the total number of OFDM symbols occupied by the PSS/SSS/PBCH signal corresponds to 6. In this case, the number (K2) of OFDM symbols available for scheduling data in a specific SF may vary according to whether or not there exists PSS/SSS/PBCH per RB. Specifically, the K2 is given by 12 (K2_1=14−2=12) in an RB where there is no PSS/SSS/PBCH and the K2 is given by 6 (K2_2=14−2−6=6) in an RB where there exist PSS/SSS/PBCH. The number (N2) of RBs of a scheduling BW can be given by N2_1+N2_2 in a specific SF. The N2_1 indicates the number of RBs not including the PSS/SSS/PBCH and the N2_2 indicates the number of RBs including the PSS/SSS/PBCH. If the N2_2 corresponds to 6, the N2 can be determined/assigned by 9 (864≥(12×12×3)+(6×12×6)=864) corresponding to a maximum integer satisfying 'L≥(K2_1×M×N2_1)+(K2_2×M×N2_2)' (i.e., 864≥(12×12×N2_1)+(6×12×6).

Figure 11:
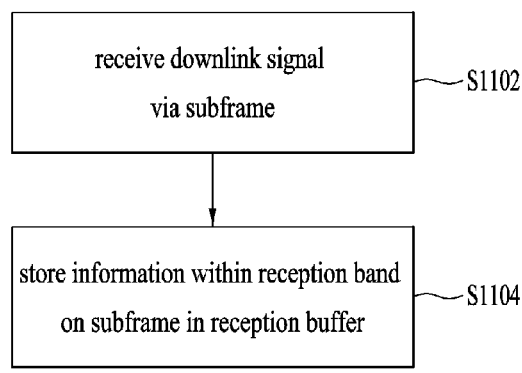

FIG. 11 is a flowchart for a procedure of receiving/processing a downlink signal according to the present invention.

Referring to FIG. 11, a UE can receive a downlink signal through a subframe [S1102]. As shown in FIG. 4, the subframe can include a control region and a data region. Subsequently, the UE can store the downlink signal in a reception (data) buffer while a control channel (e.g., PDCCH) is detected/received/decoded or before the control signal is terminated. A size of the reception (data) buffer can be fixed. Meanwhile, a size of a scheduling BW can be controlled or adjusted according to a subframe (set) in consideration of a subframe structure/configuration. The subframe structure/configuration may vary according to a CP length (e.g., normal/extended CP), a radio frame type (e.g., FDD/TDD), an SF type (e.g., normal/special SF), an RB region (e.g., a region in which PSS/SSS/PBCH is transmitted), an RS resource (e.g., CRS, CSI-RS, DMRS, number of antenna ports), and the like. The majority of information on the SF structure/configuration is broadcasted through a system information (e.g., PBCH (MIB)), RRC (radio resource control)) message and a CP length can be identified by a time difference between a PSS and an SSS. And, a size of a scheduling BW can be configured in advance according to a subframe structure/configuration or a subframe (set).

For example, a size of a scheduling BW can be configured as follows in an SF.
   FDD, when a normal CP is set: 6 RBs
   FDD, when an extended CP is set: 7 RBs
   TDD, normal SF: 6 RBs
   TDD, special SF: 10 RBs (when DwPTS is configured by 9 OFDM symbols)

Meanwhile, a scheduling BW can be determined or assigned in consideration of a simultaneous reception operation/buffering operation for a data and a common signal (e.g., PSS/SSS/PBCH). For example, the number of RBs of a reference scheduling BW (e.g., a scheduling BW corresponding to a reference SF) can be determined by 7 taking into consideration that a PSS/SSS/PBCH signal is mapped/transmitted to a center 6 RBs in a system BW configured by the even number of RBs and the PSS/SSS/PBCH signal is mapped/transmitted to a center 7 RBs in a system BW configured by the odd number of RBs. In a state that application of a buffer size, which is determined or implemented based on the reference scheduling BW, is assumed, all of the aforementioned proposed methods can be similarly applied.

The proposed method and the principle of the present invention can be applied not only to a case of DL scheduling/reception operation but also to a scheme of determining/assigning a scheduling BW for data scheduling/reception operation in UL. In UL, the number of SC-FDMA symbols available for scheduling data can be determined according to a CP length (e.g., normal/extended CP), whether or not there is an SC-FDMA symbol (capable of) transmitting a UE-specific SRS or a cell-specific SRS, and the like. Hence, a scheduling BW can be differently assigned according to a UL SF structure/configuration.

Figure 12:
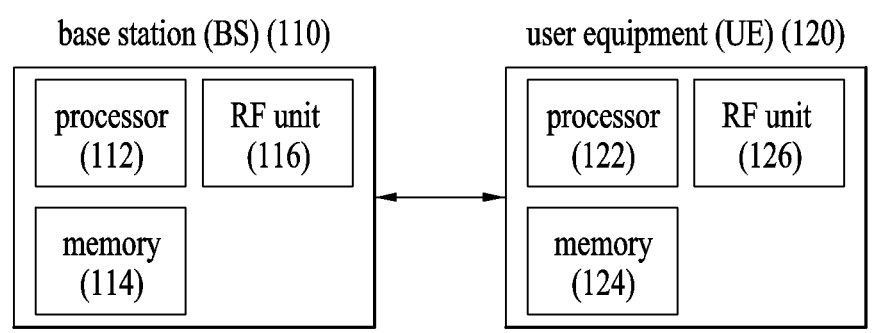
FIG. 12 is a block diagram of a Base Station (BS) and a User Equipment (UE) according to an embodiment of the present invention.

FIG. 12 is a block diagram of a BS and a UE which are applicable to an embodiment of the present invention.

Referring to FIG. 12, a wireless communication system includes a BS 110 and a UE 120. A transmitter is a part of the BS 110 and a receiver is a part of the UE 120 on DL. A transmitter is a part of the UE 120 and a receiver is a part of the BS 110 on UL. The BS 110 includes a processor 112, a memory 114, and a Radio Frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a method of performing communication and an apparatus therefor when MTC is supported in a wireless communication system.

What is claimed is:

1. A method of receiving a downlink signal, which is received by a user equipment (UE) in a wireless communication system, the method comprising:
   obtaining information on a subframe configuration;
   receiving a subframe containing a first time domain and a second time domain; and
   storing a downlink signal on a reception band in a first reception buffer in the second time domain of the subframe,
   wherein a size of the reception band is differently configured according to a subframe configuration using the information on the subframe configuration, and
   wherein the information on the subframe configuration comprises at least one selected from the group consisting of cyclic prefix (CP) configuration information, special subframe configuration information, reference signal (RS) configuration information and information on a length of the first time domain.

2. The method of claim 1, further comprising:
   storing a downlink signal on a system band in a second reception buffer in the first time domain of the subframe,
   wherein the size of the reception band is smaller than a size of the system band.

3. The method of claim 1, wherein if a normal CP is set, the size of the reception band corresponds to N1 resource blocks (RBs), and
   wherein if an extended CP is set, the size of the reception band corresponds to N2 RBs,
   where N1 corresponds to a positive integer, N2 corresponds to a positive integer, and N1 is smaller than the N2.

4. The method of claim 3, wherein if the normal CP is set, the number of orthogonal frequency division multiplexing (OFDM) symbols available for transmitting data in the subframe corresponds to K1, and
   wherein if the extended CP is set, the number of OFDM symbols available for transmitting data in the subframe corresponds to K2,
   where K1 corresponds to a positive integer, K2 corresponds to a positive integer and K1 is greater than K2.

5. The method of claim 3, wherein N1 corresponds to 6 and N2 corresponds to 7.

6. A user equipment used in a wireless communication system, the user equipment comprising:
   a radio frequency (RF) unit; and
   a processor configured to:
      obtain information on a subframe configuration,
      control the RF unit to receive a subframe containing a first time domain and a second time domain, and store a downlink signal on a reception band in a first reception buffer in the second time domain of the subframe, wherein a size of the reception band is differently configured according to a subframe configuration using the information on the subframe configuration, and wherein the information on the subframe configuration comprises at least one selected from the group consisting of cyclic prefix (CP) configuration information, special subframe configuration information, reference signal (RS) configuration information and information on a length of the first time domain.

7. The user equipment of claim 6, wherein the processor is further configured to store a downlink signal on a system band in a second reception buffer in the first time domain of the subframe, and wherein the size of the reception band is smaller than a size of the system band.

8. The user equipment of claim 6, wherein if a normal CP is set, the size of the reception band corresponds to N1 resource blocks, and wherein if an extended CP is set, the size of the reception band corresponds to N2 RBs, where N1 corresponds to a positive integer, N2 corresponds to a positive integer, and N1 is smaller than the N2.

9. The user equipment of claim 8, wherein if the normal CP is set, the number of orthogonal frequency division multiplexing (OFDM) symbols available for transmitting data in the subframe corresponds to K1, and wherein if the extended CP is set, the number of OFDM symbols available for transmitting data in the subframe corresponds to K2, where K1 corresponds to a positive integer, K2 corresponds to a positive integer, and K1 is greater than the K2.

10. The user equipment of claim 8, wherein N1 corresponds to 6 and N2 corresponds to 7.

* * * * *